(12) United States Patent
Song et al.

(10) Patent No.: US 9,818,040 B2
(45) Date of Patent: Nov. 14, 2017

(54) METHOD AND DEVICE FOR DETECTING AN OBJECT

(71) Applicant: THOMSON LICENSING, Issy les Moulineaux (FR)

(72) Inventors: Wenjuan Song, Beijing (CN); Lin Du, Beijing (CN); Jianping Song, Beijing (CN)

(73) Assignee: THOMSON LICENSING, Issy les Moulineaux (FR)

( * ) Notice: Subject to any disclaimer, the term of this patent is extended or adjusted under 35 U.S.C. 154(b) by 25 days.

(21) Appl. No.: 14/900,169

(22) PCT Filed: Jun. 20, 2013

(86) PCT No.: PCT/CN2013/077595
§ 371 (c)(1),
(2) Date: Dec. 20, 2015

(87) PCT Pub. No.: WO2014/201667
PCT Pub. Date: Dec. 24, 2014

(65) Prior Publication Data
US 2016/0148069 A1    May 26, 2016

(51) Int. Cl.
*G06K 9/00*    (2006.01)
*G06K 9/46*    (2006.01)
(Continued)

(52) U.S. Cl.
CPC .............. *G06K 9/46* (2013.01); *G06F 3/013* (2013.01); *G06T 7/593* (2017.01); *G06T 7/73* (2017.01);
(Continued)

(58) Field of Classification Search
CPC ........... G06T 7/593; G06T 2207/30201; G06T 2200/04; G06T 2207/10012;
(Continued)

(56) References Cited

U.S. PATENT DOCUMENTS

2008/0152214 A1    6/2008   Sawachi
2008/0212835 A1    9/2008   Tavor
(Continued)

FOREIGN PATENT DOCUMENTS

CN    101321269    12/2008
CN    101959042    1/2011
(Continued)

OTHER PUBLICATIONS

European Search Report of EP 13887340 dated Jan. 16, 2017.
(Continued)

*Primary Examiner* — Li Liu

(57) ABSTRACT

It is provided a method for detecting an object in a left view image and a right view image, comprising steps of receiving the left view image and the right view image; detecting a coarse region containing the object in one image of the left view image and the right view image; detecting the object within the detected coarse region in the one image; determining a coarse region in the other image of the left view image and the right view image based on the detected coarse region in the one image and offset relationship indicating position relationship of the object in a past left view image and a past right view image; and detecting the object within the determined coarse region in the other image.

7 Claims, 5 Drawing Sheets

(51) Int. Cl.
  *H04N 13/00* (2006.01)
  *G06F 3/01* (2006.01)
  *G06T 7/73* (2017.01)
  *G06T 7/593* (2017.01)
  *H04N 13/02* (2006.01)

(52) U.S. Cl.
  CPC ......... *H04N 13/00* (2013.01); *H04N 13/0003* (2013.01); *H04N 13/02* (2013.01); *G06K 2009/4666* (2013.01); *G06T 2200/04* (2013.01); *G06T 2207/30201* (2013.01); *H04N 13/0239* (2013.01); *H04N 2013/0092* (2013.01)

(58) Field of Classification Search
  CPC ...... G06T 2207/10021; H04N 13/0239; H04N 13/00; H04N 2013/0092; G06K 9/46; G06K 9/00248
  See application file for complete search history.

(56) References Cited

U.S. PATENT DOCUMENTS

| | | |
|---|---|---|
| 2009/0213219 A1 | 8/2009 | Eggert et al. |
| 2009/0304232 A1 | 12/2009 | Tsukizawa |
| 2011/0012991 A1 | 1/2011 | Watanabe et al. |
| 2012/0242803 A1 | 9/2012 | Tsuda et al. |
| 2012/0327078 A1 | 12/2012 | Liao et al. |
| 2013/0010084 A1* | 1/2013 | Hatano .................. G03B 35/08 348/47 |
| 2013/0107207 A1* | 5/2013 | Zhao ..................... A61B 3/0058 351/206 |
| 2013/0113901 A1* | 5/2013 | Mori ...................... G03B 35/16 348/54 |

FOREIGN PATENT DOCUMENTS

| | | |
|---|---|---|
| CN | 102435172 | 5/2012 |
| KR | 100544677 | 1/2006 |
| WO | WO2004107266 | 12/2004 |

OTHER PUBLICATIONS

European Search Opinion of EP 13887340 dated Jan. 16, 2017.

Marchesotti et al., "Cooperative Multisensor System for Real-Time Face Detection and Tracking in Uncontrolled Conditions", Proceedings of SPIE vol. 5685, Image and Video Communications and Processing, Apr. 6, 2005, pp. 100-114.

Wang et al., "Reasearch on object recognition of intelligent robot base on binocular vision", Applied Mechanics and Materials, vol. 127, 2012, pp. 300-304.

\* cited by examiner

METHOD AND DEVICE FOR DETECTING AN OBJECT

This application claims the benefit, under 35 U.S.C. §365 of International Application PCT/CN2013/077595, filed Jun. 20, 2013, which was published in accordance with PCT Article 21(2) on Dec. 24, 2014 in English.

TECHNICAL FIELD

The present invention relates to 3D technology, and more particularly, relates to a method and a device for detecting an object in a left view image and a right view image.

BACKGROUND

Eye tracking is the process of measuring either the point of gaze ("where one is looking") or the motion of an eye relative to the head. It has been used in diverse applications such as in visual system, in psychology, in cognitive linguistics and in product design.

In the past, several methods for following eye movement were developed based on light reflected on the cornea. Lately, many biometric techniques have been developed allowing identification of faces, iris, etc based on digital image processing algorithms which are called non-invasive methods. "Face and eye tracking algorithm based on digital image processing", which was published in Systems, Man, and Cybernetics, 2001 IEEE International Conference on (Volume: 2) (pages: 1178-1183 vol. 2, ISSN: 1062-922X, Print ISBN: 0-7803-7087-2), discloses a non-invasive interface to track eye position using digital image processing techniques. It provides a method for eye tracking including: coarse face detection, fine face detection, finding the eye region of maximum probability, map of the pupil location and pupil detection.

It is desired a method for a 3D camera (or called stereo camera) to track user's eyes.

SUMMARY

According to an aspect of the present invention, it is provided a method for detecting an object in a left view image and a right view image, comprising steps of receiving the left view image and the right view image; detecting a coarse region containing the object in one image of the left view image and the right view image; detecting the object within the detected coarse region in the one image; determining a coarse region in the other image of the left view image and the right view image based on the detected coarse region in the one image and offset relationship indicating position relationship of the object in a past left view image and a past right view image; and detecting the object within the determined coarse region in the other image.

According to another aspect of the present invention, it is provided a device for detecting an object in a left view image and a right view image, comprising a storage for storing offset relationship indicating position relationship of the object in a past left view image and a past right view image; and a processor for receiving the left view image and the right view image; detecting a coarse region containing the object in one image of the left view image and the right view image; detecting the object within the detected coarse region in the one image; determining a coarse region in the other image of the left view image and the right view image based on the detected coarse region in the one image and offset relationship indicating position relationship of the object in a past left view image and a past right view image; and detecting the object within the determined coarse region in the other image.

It is to be understood that more aspects and advantages of the invention will be found in the following detailed description of the present invention.

BRIEF DESCRIPTION OF THE DRAWINGS

The accompanying drawings, which are included to provide a further understanding of the invention and are incorporated in and constitute a part of this application, will be used to illustrate an embodiment of the invention, as explained by the description. The invention is not limited to the embodiment.

In the drawings.

DETAILED DESCRIPTION

The embodiment of the present invention will now be described in detail in conjunction with the drawings. In the following description, some detailed descriptions of known functions and configurations may be omitted for clarity and conciseness.

Figure 1:
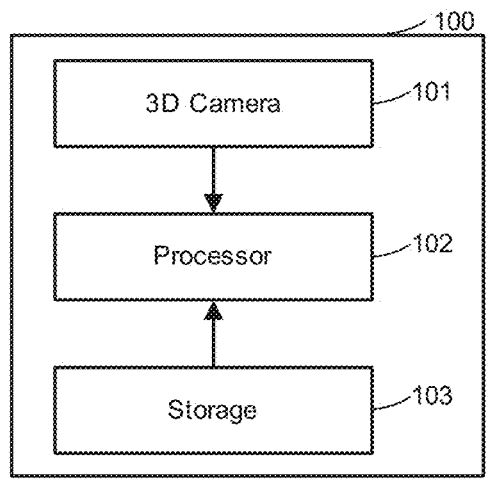
FIG. 1 is a block diagram showing a device for tracking eyes according to an embodiment of the present invention.

FIG. 1 is a block diagram showing a device 100 for eye tracking in a 3D environment according to an embodiment of present invention. The device 100 comprises a 3D camera 101, a processor 102 and a storage 103.

The 3D camera 101 is used to capture a 3D image or a sequence of 3D images of more than one object, and output the captured data to the processor 102. Herein, one 3D image is composed of a left image corresponding to left view of the object and a right image corresponding to right view of the object, wherein the left image and the right image are taken at a same time point. So a sequence of 3D images is a sequence of pairs of left images and right images.

The storage 103 is used to store data and the processor 102 is used to process data.

Figure 7A:
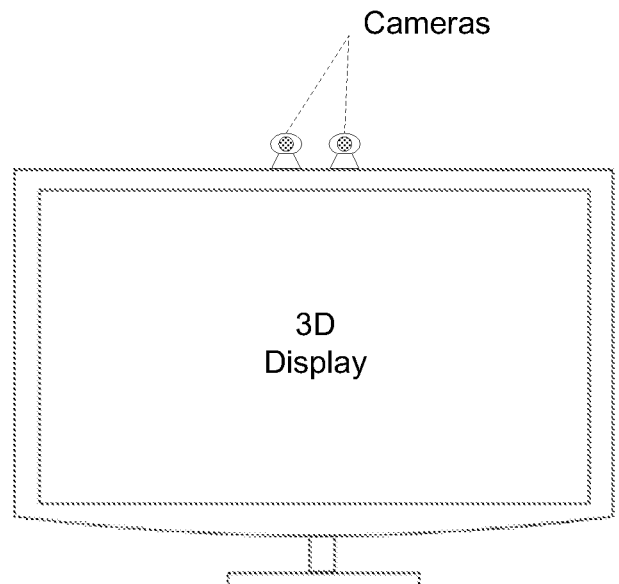
FIGS. 7A and 7B are diagrams separately showing a 3D camera mounted a display and a 3D camera mounted on a tablet according to the embodiment of present invention.
Figure 7B:
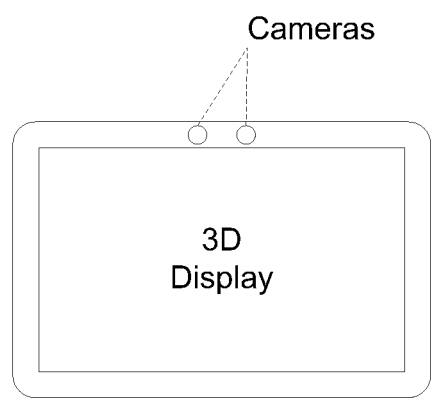

FIGS. 7A and 7B are diagrams showing two applicable scenario of the present invention. Specifically, FIG. 7A shows a 3D display with a 3D camera mounted, and FIG. 7B shows a tablet with a 3D camera mounted.

Figure 2:
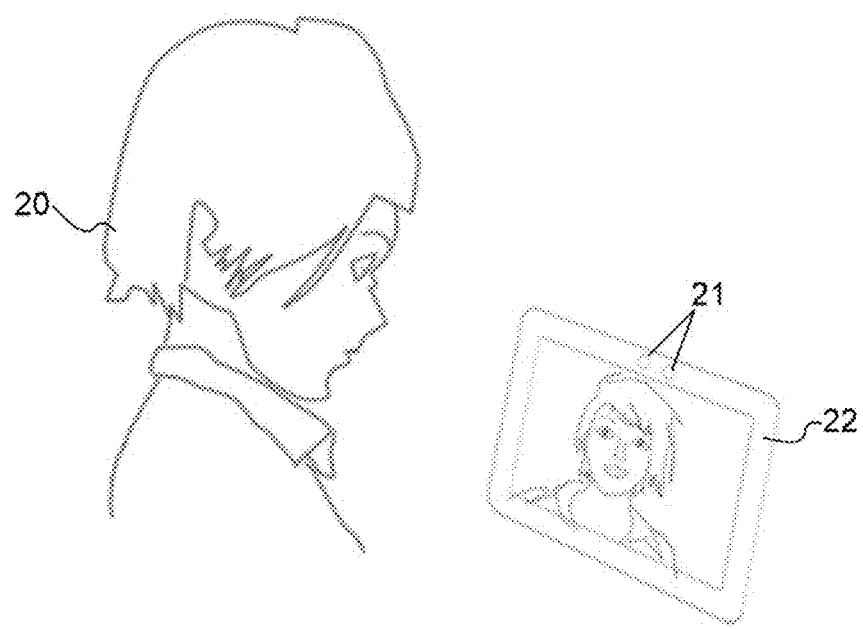
FIG. 2 is a diagram showing a user looking at the tablet according to the embodiment of the present invention.

Taking the tablet 22 with a 3D camera 21 as example, FIG. 2 shows that a user 20 is looking at the tablet and the tablet uses the 3D camera to capture a 3D image or a sequence of 3D images of the user and uses the 3D display to display the captured 3D image or the captured sequence of 3D images.

In order to facilitate description, the two lenses of the 3D camera 21 are named Cam0 and Cam1 from right to left.

Figure 3A:
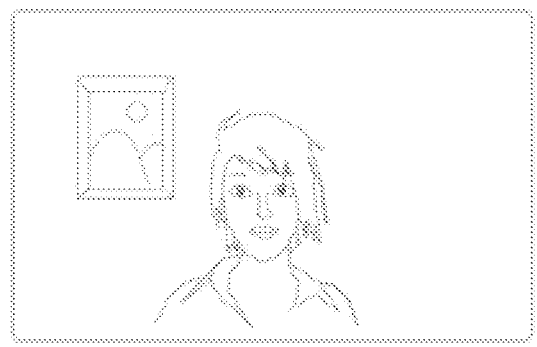
FIGS. 3A and 3B are diagrams showing images taken separately by the Cam0 and Cam1 according to the embodiment of the present invention.
Figure 3B:
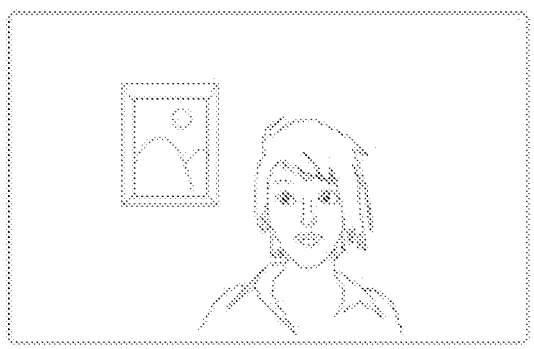

FIG. 3A and FIG. 3B are diagrams showing images taken separately by the Cam0 and Cam1. In the FIGS. 3A and 3B, the solid lines correspond to the border lines of the images. As can be seen in the FIGS. 3A and 3B, objects in the image shown by the FIG. 3A has an offset in position with the corresponding objects in the image shown by the FIG. 3B.

The present invention takes advantage of 1) the determined coarse region of user's face in one of current left image and current right image and 2) offset relationship between previous left image and previous right image to determine the coarse region in the other image. Herein, the offset relationship indicates position relationship of two corresponding points in the previous left image and the previous right image, and is used to predict the position of a point in one image after a corresponding point in the other image is detected.

Figure 4:
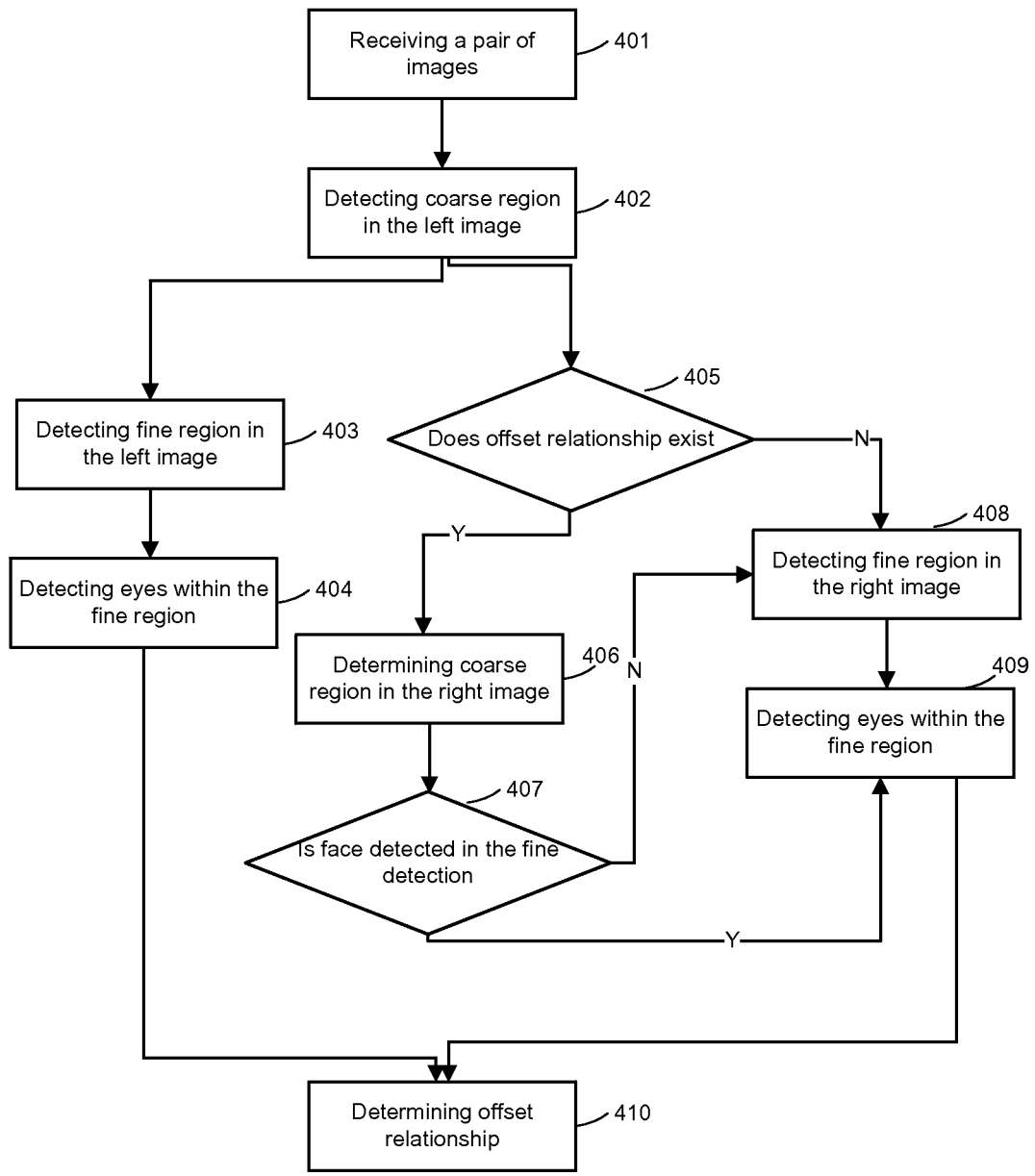
FIG. 4 is a flow chart showing a method for tracking eyes by using a 3D camera according to the embodiment of the present invention

FIG. 4 is a flow chart showing a method for tracking eyes by using a 3D camera according to the embodiment of present invention.

In the step 401, the processor 102 receives a pair of left image and right image outputted by the 3D camera 101.

In the step 402, the processor 102 detects a coarse region of user face in one of the left image and the right image. In this example, we use the left image. Herein, there is no order between the step 403 and the step 405, which means that they can be processes in parallel.

In the steps 403 and 404, the processor 102 detects a fine region of user face in the left image and detects eyes within the fine region for the left image. The detection method here can be used the same as disclosed in the article titled "Face and eye tracking algorithm based on digital image processing". But it shall note that other coarse-to-fine approach can also be used here.

In the step 405, the processor 102 determines if an offset relationship between previous left image and previous right image exist. If it does not exist, it goes to step 408, and if it exists it goes to step 406.

In the step 408 the processor 102 detects a fine region of the user face in the right image.

In the step 409, the processor 102 detects eyes within the fine region for the right image.

In the step 406, the processor 102 determines coarse region of the user face in the right image based on the detected coarse region of the user face in the left image and offset relationship between previous left image and previous right image. The details about the determination will be described below after the description of the method.

In the step 407, the processor 102 determines if the user face is detected during the fine detection. If the user face is detected, it goes to the step 409, and if not, it goes to the step 408.

In the step 410, the processor 102 determines offset relationship between the current left image and the current right image based on detected eyes in the current left image and the current right image, and stores the determined the offset relationship in the storage 103.

Below explains how to determine the offset relationship and how to use the offset relationship to determine the coarse region in the other image.

Figure 5:
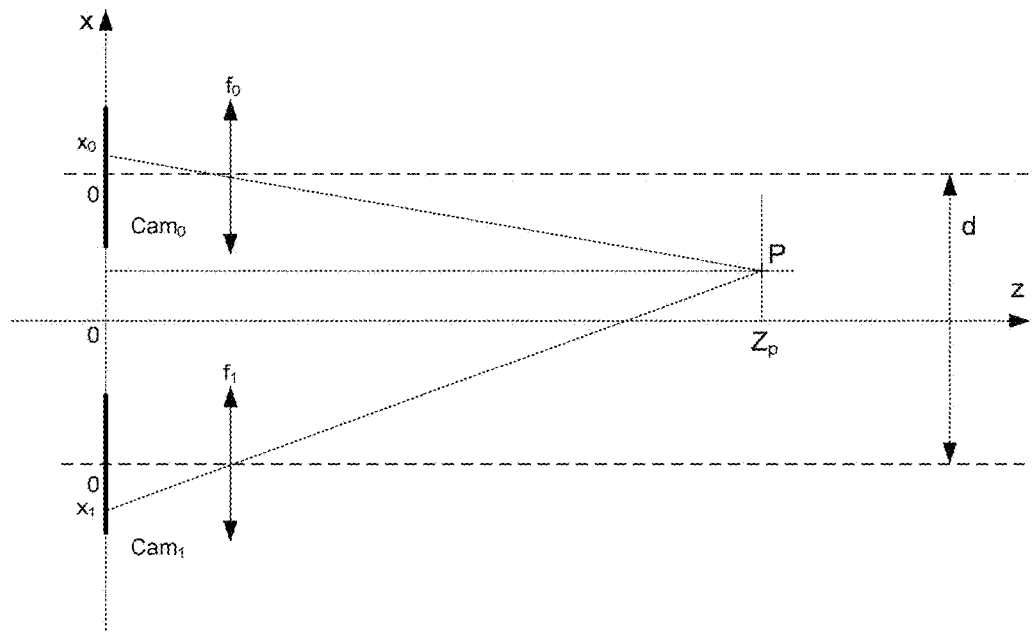
FIG. 5 is a diagram showing the geometric position according to the embodiment of the present invention.

It is assumed the 3D display is based on vertical parallax barriers; and in a virtual 3D coordinates system, X axis has a horizontal direction and is parallel to a plain of the display surface, Y axis has a vertical direction and is parallel to the plain of the display surface and Z axis is perpendicular to the plain of the display surface. The origin of the 3D coordinates system is set in the center of the display surface. The position of the 3D views shown in front of the screen does not depend on the position along the axis Y. Therefore, only the X and Z axes need to be considered. FIG. 5 is a diagram showing the geometric position among the 3D camera and a desired-to-detect object, i.e. eyes in the example. In the FIG. 5, $f_0$ and $f_1$ are the focal length of cam0 and cam1; d is the distance between cam0 and cam1; $x_0$ and $x_1$ are the absolute values of P in the images captured by the cam0 and cam1 and $Z_p$ is the distance between the 3D camera and the desired-to-detect object.

In the step 410, because the processor 102 has information about the detected eyes in the left image and the detected eyes in the right image, the processor 102 can determine values of $x_0$ and $x_1$ and use the following formula (1) to calculated $Z_p$.

$$Z_p = \frac{d + x_0 + x_1}{\frac{x_0}{f_0} + \frac{x_1}{f_1}} \qquad \text{Formula (1)}$$

When the processor 102 determines the coarse region in the image outputted by the Cam1 in the step 406, the following formula (2) and formula (3) are used for determining a point in the right image based on the detected corresponding point in the left image (in the formulas, $X_0$ and $Y_0$ represent a point in the left image and $X_1$ and $Y_1$ represent a corresponding point in the right image).

Figure 6A:
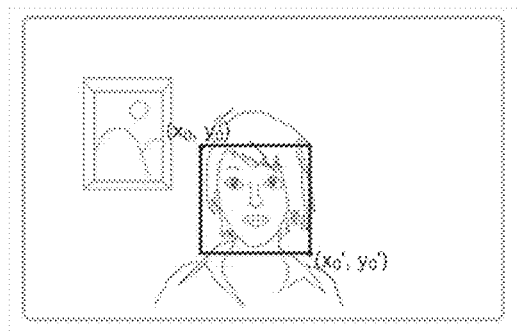
FIG. 6A is a diagram showing the detected coarse region in the left image.
Figure 6B:
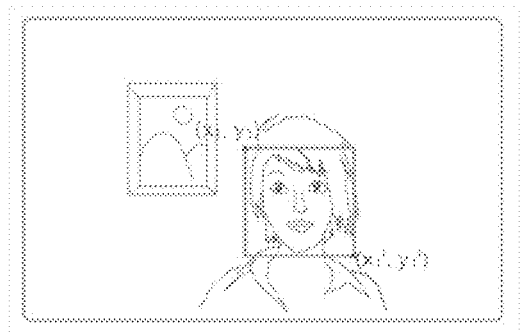
FIG. 6B is a diagram showing the determined coarse region in the right image according to the embodiment of the present invention.

FIG. 6A is a diagram showing the detected coarse region in the left image, and FIG. 6B is a diagram showing the determined coarse region in the right image. In this example, the coarse region is a rectangle and defined by top-left point and bottom-right point. Therefore, based on the formula (2) and formula (3), the top-left point $(X_1, Y_1)$ and bottom-right point $(X_1', Y_1')$ of the coarse region in the right image can be calculated.

$$x_1 = \frac{d - x_0\left(\frac{z_p}{f_0} - 1\right)}{\frac{z_p}{f_1} - 1} \qquad \text{Formula (2)}$$

$$y_1 = y_0 \qquad \text{Formula (3)}$$

According to the embodiment, the offset relationship is determined and updated in response to each pair of left image and right image. According to a variant, only when the face cannot be detected in the step 407, the offset relationship is determined and updated. In other words, the offset relationship between a past left image and a past right image (but the past left image and the past right image are taken at the same time) is not updated until the processor determines the face cannot be detected within the determined coarse region.

According to a variant of present embodiment, the present invention is not limited to eye tracking. It is applicable to a system adopting the coarse-to-fine approach to track or detect an object in a sequence of 3D images, wherein the detected coarse region in one of current left image and current right image and offset relationship between previous left image and previous right image to determine coarse region in the other image. And then fine detection technique is used to 1) detect the object within the detected coarse region in one image and 2) detect the object within the determined coarse region in the other image.

According to the present embodiment, the offset relationship between the left image and the right image are determined based on the detected eyes in the left image and the right image. According to a variant, the offset relationship is determined based on determined fine regions of the user face in the left image and the right image.

It shall note the features from above embodiment and its variants can be combined and substituted.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the invention as defined by the appended claims.

The invention claimed is:

1. A method for determining an eye gaze from a pair of eyes of a face in a left view image and a right view image, comprising:
   detecting a rectangle coarse region containing the face in one of the left view image and the right view image;
   detecting the face within the detected rectangle coarse region in the one of the left view image and the right view image
   determining a rectangle coarse region in the other of the left view image and the right view image based on the detected rectangle coarse region in the one of the left view image and the right view image and offset relationship indicating position relationship of the face in a past left view image and a past right view image;
   detecting the face within the determined rectangle coarse region in the other of the left view image and the right view image; and
   detecting the pair of eyes in the detected face in the other of the left view image and the right view image to determine the eye gaze.

2. The method of the claim 1, further comprising
   determining offset relationship of the face in the left view image and right view image based on the detected face in the left view image and the detected face in the right view image.

3. The method of the claim 1, wherein the past left view image is a previous left view image and the past right view image is a previous right view image, the method further comprising
   determining offset relationship of the face in the left view image and right view image based on the detected face in the left view image and the detected face in the right view image.

4. A device for determining an eye gaze from a pair of eyes of a face in a left view image and a right view image, comprising:
   a storage for storing offset relationship indicating position relationship of the face in a past left view image and a past right view image; and
   a processor configured to:
   detect a rectangle coarse region containing the face in one of the left view image and the right view image; detecting the face within the detected coarse region in the one of the left view image and the right view image;
   determine a rectangle coarse region in the other of the left view image and the right view image based on the detected rectangle coarse region in the one of the left view image and the right view image and offset relationship indicating position relationship of the object in a past left view image and a past right view image;
   detect the face within the determined rectangle coarse region in the other of the left view image and the right view image; and
   detect the pair of eyes in the detected face in the other of the left view image and the right view image to determine the eye gaze.

5. The device of the claim 4, further comprising a 3D camera for capturing and outputting the left view image and the right view image.

6. The device of the claim 4, wherein the processor is further configured to determine offset relationship of the face in the left view image and right view image based on the detected face in the left view image and the detected face in the right view image.

7. The device of the claim 4, wherein the past left view image is a previous left view image and the past right view image is a previous right view image, the processor is further configured to determine offset relationship of the face in the left view image and right view image based on the detected face in the left view image and the detected face in the right view image.

* * * * *